(No Model.) 2 Sheets—Sheet 1.
G. K. ANDERSON.
TYPE WRITING MACHINE.
No. 410,628. Patented Sept. 10, 1889.
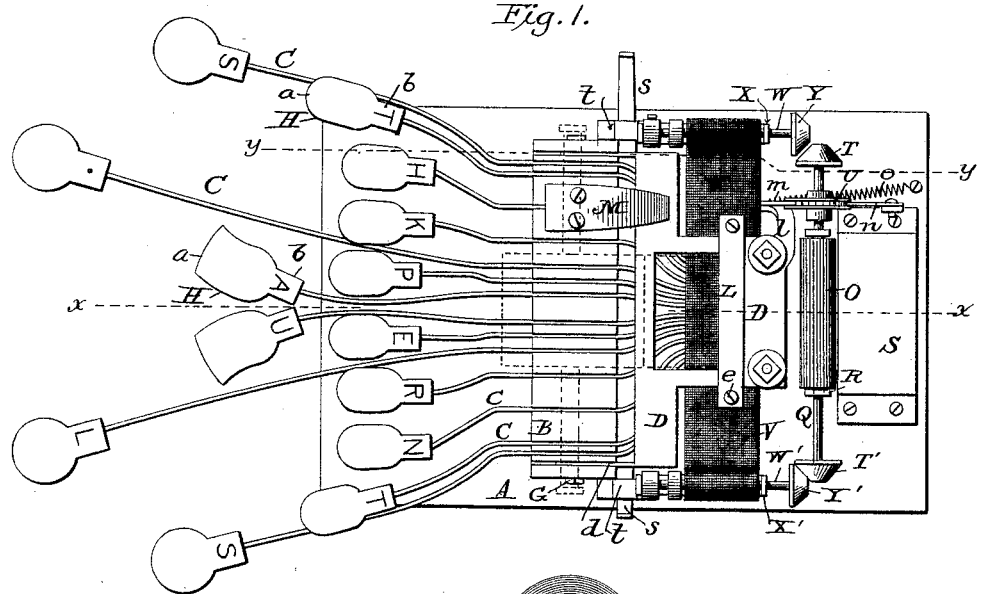
Fig. 1.
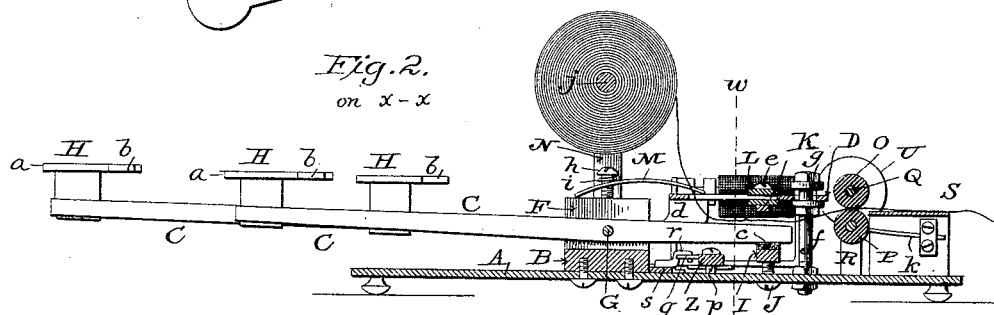
Fig. 2. on x-x
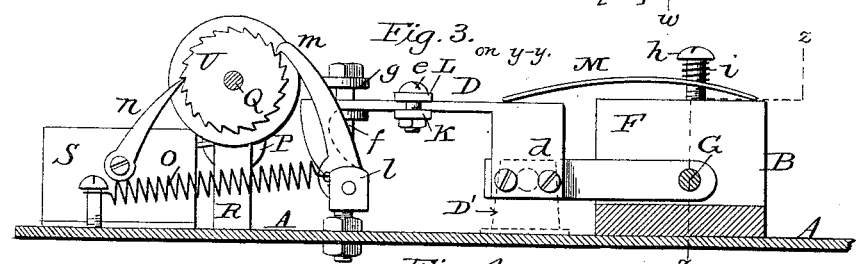
Fig. 3. on y-y.
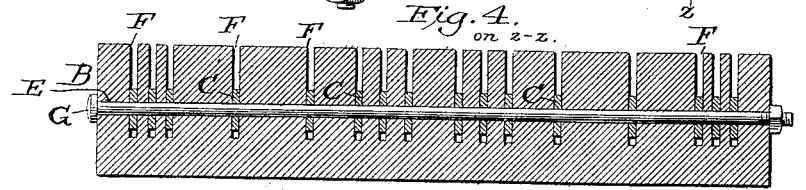
Fig. 4. on z-z.
Witnesses:
James F. Duhamel
Arthur Ashley
Inventor:
George Kerr Anderson,
by Dodge Sons,
his Attys.

(No Model.) 2 Sheets—Sheet 2.
G. K. ANDERSON.
TYPE WRITING MACHINE.
No. 410,628. Patented Sept. 10, 1889.
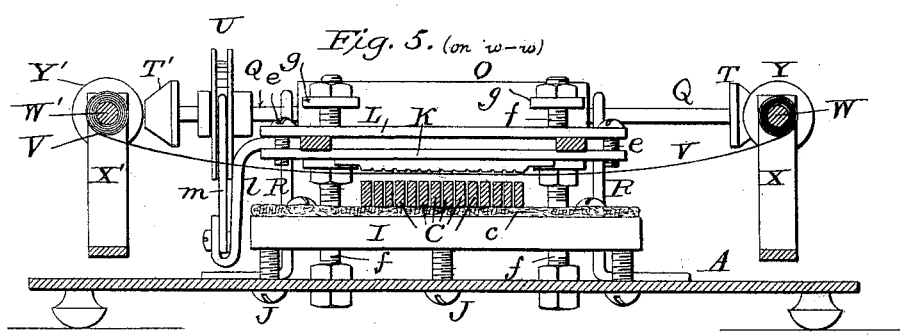
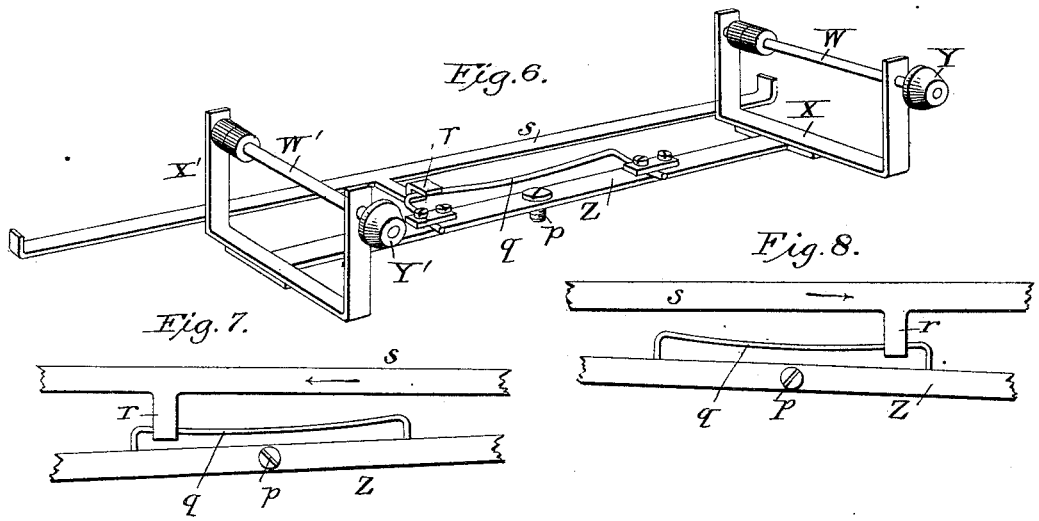
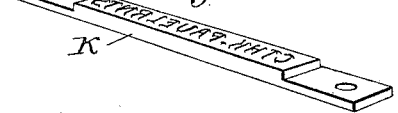
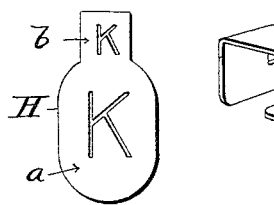
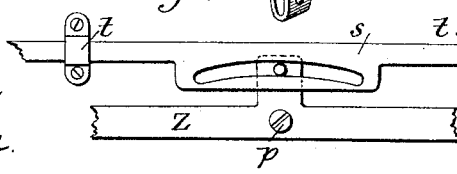
Witnesses:
James F. DuHamel
Horace A. Dodge
George Kerr Anderson,
Inventor;
by Dodge & Sons,
his Attys.

UNITED STATES PATENT OFFICE.

GEORGE KERR ANDERSON, OF MEMPHIS, TENNESSEE.

TYPE-WRITING MACHINE.

SPECIFICATION forming part of Letters Patent No. 410,628, dated September 10, 1889.

Application filed November 15, 1887. Serial No. 255,208. (No model.)

*To all whom it may concern:*

Be it known that I, GEORGE KERR ANDERSON, of Memphis, in the county of Shelby and State of Tennessee, have invented certain new and useful Improvements in Type-Writing Machines, of which the following is a specification.

My invention relates to type-writing machines, and more particularly to that class in which the printing-characters appear in a straight line across the sheet of paper.

While the machine is designed primarily for stenographic work, various features of the invention may be applied to the printing or writing machines now in use.

In the drawings, Figure 1 is a top plan view of my improved machine with the paper-roll removed; Fig. 2, a vertical sectional view on the line $x\ x$ of Fig. 1; Fig. 3, a similar view on the line $y\ y$ of Fig. 1; Fig. 4, a sectional view on the line $z\ z$ of Fig. 3; Fig. 5, a similar view on the line $w\ w$ of Fig. 2; Figs. 6, 7, and 8, views illustrating the construction and operation of the devices for supporting the inking-ribbon; Figs. 9 to 12, views illustrating certain details hereinafter referred to.

A indicates a base-board or support, and extending transversely across the same is a block B of the form shown in Figs. 1, 2, 3, and 4, in which the key-bars C, and preferably the type-plate D, are journaled. The block B is drilled longitudinally to form a hole or opening E, as shown in Figs. 2, 3, and 4, and intersecting this hole or opening E is a series of vertical slots F, which are adapted to receive the key-bars C.

G indicates a bolt or stem passing through all of the key-bars and resting in the hole E, the said bolt being secured in place in any suitable manner, and it will thus be seen that by means of the single bolt or stem G all of the key-bars are securely held in position.

The key-bars C, of which there are preferably fourteen in number, are each provided with a button H of the form shown in Figs. 1, 2, and 12—that is to say, it comprises a main oval or circular body $a$ and a tail or extension $b$, the latter extending inward in line with the key-bar. The main body $a$ may be constructed in any of the ways now commonly employed, and is adapted to receive a representation of the character to be printed, while the tail or extension is adapted to receive a fac-simile of the character, so that when the operator's finger is upon the main body of the key it will not be necessary to remove the finger to ascertain what character has been struck.

The representation of the character on the main portion $a$ may be omitted, if desired.

The arrangement of the characters by which the machine is adapted for stenographic work will be explained further on.

The key-bars C project forward from the block or support B, and may be finished smooth on their upper faces, and immediately beneath the inner ends of the said bars C is a cross-bar or support I, which is adjustably secured to the base A by means of screws J, as shown in Figs. 2 and 5. This bar or support I extends transversely beneath the key-bars, and will advisably, though not necessarily, be furnished on its upper face with a pad $c$, upon which the key-bars may rest when not in use.

The plate D comprises an open substantially rectangular frame, as clearly shown in Figs. 1, 2, 3, and 11, and is provided at its rear end with two perforated arms $d\ d$, which may pass through suitable slots in the block B, and which may, if desired, be also journaled upon the rod or stem G.

Secured upon the under face of the plate D is the type or printing plate K, which extends transversely across but above the inner ends of the key-bars C, as shown in Figs. 2 and 5. As shown in Fig. 10, the type or printing-characters are formed, preferably, upon and integral with the plate K, although it is obvious that a series of separate types might be secured together upon a plate.

The plate K is held in place by means of a plate L upon the upper side of the plate and screws $e$, passing through the plates K L; but it is obvious that the plate L may be omitted and the printing-plate K secured to the plate in any other manner desired.

Printing-plate K may be readily removed at any time and with little trouble and a new style of printing-character substituted.

It is also obvious that, instead of placing the printing-characters upon the plate, they may be carried by the key-bars, one on each key, this plan being merely a reversal of that shown.

The plate D is perforated near its two outer corners to receive stems or bolts $ff$, which project upwardly from the base-board A, and are provided above and below the plate with stops $g\ g$, to limit the movement of the plate, the said stops being advisably made of rubber, felt, or leather, to make the operation of the machine as noiseless as possible.

A flat spring (or springs) M is secured to the block B, and bears at its other end upon the upper face of the plate D, as shown in Figs. 1, 2, and 3, serving to hold the free end of the plate down. This spring M is secured to the block B by means of screws, which pass freely through the spring and screw into the block B, coiled springs $i\ i$ encircling the screws $h\ h$ and bearing at opposite ends against the head of the screws and the flat springs M. By turning the screws $h\ h$ the springs $i\ i$ will be compressed or allowed to expand, and hence by bearing with greater or less force upon the plate spring M will serve to control and vary the action of the latter.

N N indicate two uprights, which are secured to the block B in any suitable manner, and carry at their upper ends a shaft $j$, upon which the roll of paper is mounted. Only one of the uprights is shown in the drawings. (See Fig. 2.)

The paper passes from the roll down through the opening in the plate D beneath the printing-characters on plate K, and thence outward between two feed-rollers O and P, the shaft Q of the upper one of which is journaled in uprights R R, secured to the base-board, as shown in Figs. 1, 2, and 3. The lower roller P is carried by arms $k$, which project from a table S, onto which the paper passes after leaving the rollers, as shown in Figs. 1, 2, and 3.

Shaft Q extends outwardly at each side of the roller O, and is provided with bevel friction-wheels T T', as clearly shown in Fig. 1, and is further provided with a ratchet-wheel U.

Carried by an arm $l$ of the plate D is a pivoted pawl $m$, which latter is arranged to engage with the teeth of wheel U, and as the plate descends preparatory to a new impression being made the pawl $m$ will turn or rotate the wheel U and its shaft Q and the roller O. By this means the paper is fed forward a sufficient distance each time an impression is made. It is of course immaterial whether one key or two or more of the keys be struck, as any movement of the key bar or bars sufficient to make an imprint or impression is all that is necessary to cause the feed of the paper.

A pawl $n$, secured to the table S, prevents backward rotation of the shaft Q, while a spring $o$ keeps the pawl $m$ in engagement with the ratchet-wheel.

The inking-ribbon V passes transversely beneath the plate above the paper and directly over the ends of the key-bars C, and is carried at its ends upon shafts W W', each of which is journaled, respectively, in a yoke or frame X X', and provided, respectively, with a bevel friction-wheel Y Y', as clearly shown in Fig. 1. The frame or yokes X X' are riveted or otherwise secured to opposite ends of a bar Z, which is pivoted at a point between its ends, by means of a screw $p$, to the base-board A, as shown in Figs. 2, 6, 7, and 8. Now as the bar Z is oscillated upon its pivot $p$ it will throw the wheel Y into contact with wheel T, or the wheel Y' into contact with wheel T', according to the direction in which the bar is oscillated. Of course, as the shaft Q and the wheels T T' always turn in the same direction, the result of bringing the wheels Y Y' alternately into engagement with the wheels T T' is merely to change the direction of travel of the ribbon. The manner of effecting this movement of the bar Z will be clearly understood upon referring to Figs. 6, 7, and 8, in which it will be noticed that the bar Z is provided with a light spring-arm $q$, which forms a yielding bearing-face for an arm $r$, carried by a sliding bar $s$, the latter being guided in its movements by loops $t\ t$, secured to the base-plate A. The bar $s$ has only a longitudinal sliding movement, and the arm $r$, carried thereby, is caused to bear upon the yielding bearing face or arm $q$ to one or the other side of the pivot $p$, as illustrated in Figs. 7 and 8. Consequently, in order to change the direction of travel of the inking-ribbon, it is only necessary to move or slide the bar or rod $s$ in one or the other direction, so as to cause the wheel Y or Y' to come into contact with wheel T or T'.

Instead of employing the spring-arm $q$, as in Figs. 6, 7, and 8, the bar or rod $s$ may be provided with a curved slot, and the bar Z with a pin to work in the slot, as shown in Fig. 9.

It is obvious that the platen may be pivoted to brackets or supports D', secured to the base-board, as indicated by dotted lines in Fig. 3, or in any other suitable manner.

The advantage secured by having the printing done directly against the plate D is that, in the first place, only half as much power is expended in working the machine as would be necessary if the pressure against the feed-plate were not utilized in printing the characters, and, in the second place, as no obstacle intervenes between the character on the plate and the key-bar, each key-bar depressed will produce an impression, which is not always the case where the resisting power of the feed mechanism is interposed between the bars or printing-characters and the plate.

Having thus described my invention, what I claim is—

1. In a type-writing machine, the combination, with a pivoted impression-plate, of a series of pivoted key-bars adapted to swing from the same center as the plate and printing-characters carried by one of said parts.

2. In a type-writing machine, the combination, with a series of pivoted key-bars, of a pivoted plate and a series of printing-characters carried by the pivoted plate directly above the key-bars.

3. In a type-writing machine, the combination, with a series of pivoted key-bars, of a pivoted impression-plate, a series of printing-characters, and a paper-feed mechanism independent of and operated by the plate, all substantially as shown.

4. In a type-writing machine, the combination, with a series of key-bars C, of a pivoted plate D, provided with a printing-plate K, a spring M, to hold the plate down, a support I for the inner ends of the key-bars, and stops $g\ g$, to limit the movement of the plate.

5. In a type-writing machine, the combination, with pivoted key-bars C, of a pivoted plate D, having printing-plate K, a spring M, a paper-feed mechanism, and a pawl carried by the plate to actuate the feed mechanism.

6. In combination with base-board A, support B, and key-bars C, plate D, provided with pawl $m$, and printing-plate K, feed-rolls O P, a shaft Q, provided with ratchet U, a spring $o$, to keep the pawl in engagement with the ratchet-wheel, and a pawl $n$, to prevent the backward rotation of the wheel U.

7. In a type-writer, the combination, with a series of pivoted key-bars and a pivoted impression-plate, of a series of printing-characters, a paper-feed mechanism actuated by the pivoted plate, an inking-ribbon, and a shaft upon which said ribbon is wound, actuated by the paper-feed mechanism.

8. In a type-writing machine, the combination, with a series of key-bars and with a pivoted impression-plate, of a series of printing-characters, a feed mechanism for the paper, actuated by the plate, an ink-ribbon, and an adjustable frame for supporting the ribbon, arranged substantially as shown, whereby the ribbon is caused to travel in one or the other direction, as desired.

9. In a type-writing machine, the combination, with a paper-feed mechanism, of a series of pivoted key-bars and a pivoted plate provided on its under face with type and arranged directly over the key-bars, substantially as shown, whereby the pressure of the key-bars against the plate causes the actuation of the feed mechanism.

10. In a type-writing machine, the combination, with a paper-feed mechanism provided with a shaft Q, having wheels T T', of a bar Z, pivoted to the frame of the machine at a point between its ends, shafts W W', located at opposite ends of bar Z and provided with wheels Y Y', and a ribbon V, wound upon the shafts W W', all substantially as shown.

11. In a type-writing machine, the combination, with the bar Z, pivoted between its ends and provided at opposite ends with shafts W W',having wheels Y Y', a sliding rod $s$, adapted to rock or tip the bar Z, and a fixed rotary shaft Q, provided with wheels T T', all substantially as shown.

12. In combination with the block B and pivoted plate D, arranged substantially as shown, a spring M, bearing at its ends upon the plate and the block, a screw $h$, passing through the spring and screwing into the block B, and a coiled spring $i$, surrounding the screw and bearing upon the spring M.

In witness whereof I hereunto set my hand in the presence of two witnesses.

GEORGE KERR ANDERSON.

Witnesses:
JAS. S. MARTIN,
W. CHAMBERLIN.